United States Patent [19]

Girshovich et al.

[11] 4,135,685
[45] Jan. 23, 1979

[54] DEVICE FOR BRAKING CONTAINERS OF PNEUMATIC TUBE TRANSPORT INSTALLATIONS

[75] Inventors: Igor I. Girshovich; Vadim Y. Pripadchev; Vladimir Tsernes; Valery I. Bagryantsev; Valery V. Berdnik; Naum Y. Kershenbaum; Jury B. Petrakov; Semen M. Zelvinsky; Tatyana D. Yastrebova, all of Moscow, U.S.S.R.

[73] Assignee: Vsesojuzny Nauchno-Issledovatelsky I Proektno-Konstruktorsky Institut Po Truboprovodnym Konteinernym Sistemam, Moscow, U.S.S.R.

[21] Appl. No.: 829,889

[22] Filed: Sep. 1, 1977

[51] Int. Cl.² ............................................. B65G 51/20
[52] U.S. Cl. ...................................................... 243/38
[58] Field of Search ...................... 243/1, 3, 20, 21, 22, 243/38; 104/138 R; 188/297, 299, 311

[56] References Cited
U.S. PATENT DOCUMENTS
623,973   5/1899   Batcheller ............................ 243/22

FOREIGN PATENT DOCUMENTS
314715   11/1971   U.S.S.R. .................................... 243/38

Primary Examiner—Robert W. Saifer
Assistant Examiner—Jeffrey V. Nase
Attorney, Agent, or Firm—Fleit & Jacobson

[57] ABSTRACT

The present invention relates to pneumatic transport installations and more particularly it relates to a device for braking a container train in a pneumatic transport installation. The tube of the pneumatic transport installation has a plug which seals off the tube, and a hole for the discharge of propelling air. The plug may be constituted either by the end wall of the receiving station, or by a previously braked container. Before the plug the tube is provided with a flow-restricting hole intended to let out the air compressed between the container and the plug, the air braking the container in the braking zone. To ensure the optimum braking conditions, the flow-restricting hole is provided with a controllable bypass valve. The valve is actuated by a special control system.

6 Claims, 4 Drawing Figures

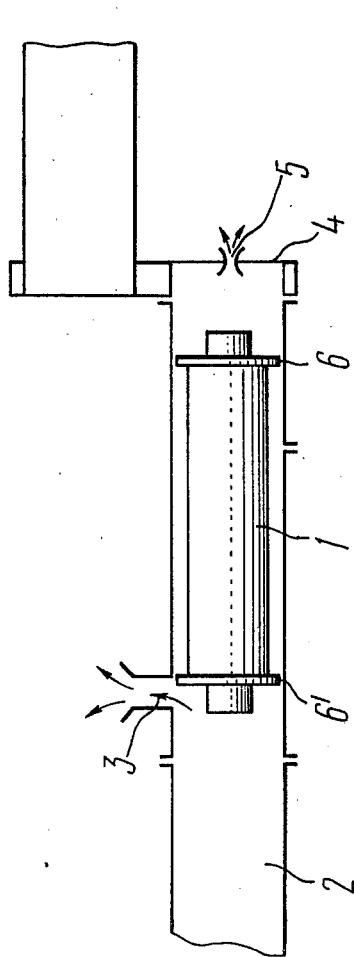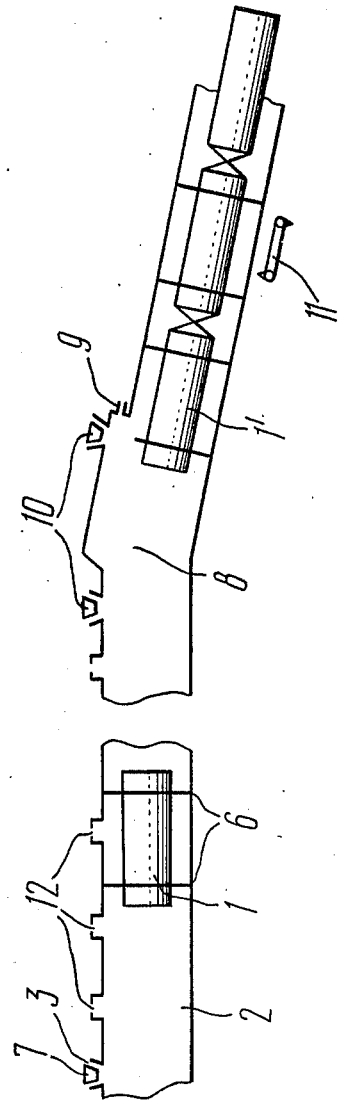

DEVICE FOR BRAKING CONTAINERS OF PNEUMATIC TUBE TRANSPORT INSTALLATIONS

The present invention relates to pneumatic tube transport installations and more particularly, to the devices for braking a container train in a pneumatic tube transport installation and can be used to the best advantage in pneumatic tube transport installations employed for propelling heavily loaded container trains.

In the description that follows the term "container train" should be understood either as a number of containers coupled to one another, or as an individual container so that both terms, i.e. "container train" and "container" will be used hereinafter without distinction.

A container comprises a receptacle moving inside the tube either on or without wheels and provided with a central or end skirts (cup seals) which assist in building up the required propelling force of the container at a small pressure difference on it, i.e. they increase the efficiency of the installation thus permitting the use of low-power air blowers. The container speeds achieved in the up-to-date pneumatic tube transport installations reach 20-30 m/s and in some cases even higher. To ensure a higher efficiency of such installations it is necessary to raise their traffic capacity (i.e. the frequency of dispatching trains into the tube).

Under these conditions, one of the most intricate problems resides in braking the container moving through the tube since at the above-indicated speeds and a heavy mass said train possesses a high kinetic energy and cannot be smoothly braked within a preset zone with sufficient ease.

One of the known devices for braking containers provides for braking such a container at a terminal station. Said device comprises a plug installed at the end of said tube, and a hole for discharging the propelling air, made in the tube wall.

The air compressed between the container skirt and the plug forms the so-called "air buffer" which slows down the container.

It is an established fact that the pneumatic tube transport installations call for stopping the containers with various masses speeds and coefficients of resistance to motion within a preset spread of the technological parameters at a predetermined point of the braking zone. The term "stopping" of the container should be understood as slowing it down from its speed to the speed within a permissible interval, namely from zero to a preset value.

The above-mentioned prior art device provides for braking the containers only to a zero speed in which case the point of their stopping in the braking zone depends substantially on their actual technological parameters. This leads to certain difficulties in subsequent processing of the containers.

Besides, it should be noted that said prior art device fails to provide for braking the containers in the pneumatic tube transport installations at intermediate stations.

BRIEF DESCRIPTION OF THE INVENTION

An object of the present invention resides in providing a possibility for braking a container at a preset point.

Another object of the present invention resides in providing a possibility for braking containers at intermediate points of the tube.

Among other objects a possibility should be mentioned of uniform braking at a preset point of containers trains with different speeds, masses and coefficients of resistance to motion.

These objects are achieved by providing a device for braking containers of a pneumatic tube transport installation comprising a hole for the discharge of the propelling air and a tube plug located after the air discharge hole in the direction of container movement so that the air compressed between the plug and the container skirt brakes the container wherein, according to the invention, there is a flow-restricting hole (flow restrictor) for letting out the compressed air from between the plug and the container skirt.

The introduction of a flow restrictor into the device for braking containers reduces the container braking time by decreasing the amplitude of container vibrations at braking.

This is due to the fact that in the course of container braking part of the compressed air enclosed between the container skirt and the plug escapes gradually into the atmosphere, and thus reduces the potential energy of compressed gas inducing said vibrations.

It is most expedient that the flow restrictor be located in the end wall of the receiving station since in this case the compressed air will escape into the atmosphere within the entire braking period which will increase the amount of the discharged air and, as a consequence, reduce the amplitude of vibrations of the braked container.

When it is desirable to stop the containers regardless of their mass and speed at a preset point, the zone of braking between the flow restrictor for the discharge of compressed air and the hole for the discharge of the propelling air is provided with a number of auxiliary flow restrictors and a safety bypass valve located in close proximity before the plug and operating when pressure in the tube between the plug and the braked container train is higher than that causing a maximum permissible acceleration of the train, in which case the hole for the discharge of propelling air is closed by a bypass valve which maintains pressure after the braked container said pressure being sufficient for building up a force stronger than the maximum force of resistance tending to keep the container in the state of rest.

This is attributable to the fact that, on entrance of the container into the braking zone the air pressure in the space between the front skirt of the container and the plug starts rising and, as soon as it reaches a limit corresponding to the maximum permissible acceleration of the container, the safety bypass valve which limits said pressure will open, thus preventing the acceleration from exceeding the permissible limit.

In the high-capacity pneumatic tube transport systems with containers entering the tube, and, consequently, the braking zone at a high rate, the braking device according to the invention uses the previously-braked container train in the function of a plug whereas the tube at the end of the braking zone has a wider portion the length of which is not less than the distance between the extreme end skirts of the train; said wider portion has a flow-restricting hole for letting out the air compressed between the moving and the previously-braked train, which hole is located after the beginning of the wider portion.

The provision of the wider braking portion in the tube allows the container located at the end of the braking zone not to close the compressed air zone by its extreme end skirts. The use of the previously braked train as a plug steps up the efficiency of the pneumatic tube transport installation. The provision of a flow-restricting hole for letting out the air in the wider portion stabilizes the container speed at the end of the braking zone.

When it becomes necessary to brake containers with varying parameters, such as mass, speed of entering the braking zone and coefficient of resistance to motion, the device according to the invention has a number of auxiliary flow restrictors and at least one safety bypass valve between the beginning of the wider portion and the hole for the discharge of the propelling air, said bypass valve operating when pressure in the tube between the moving and already-braked train is higher than that causing a maximum permissible acceleration.

The safety bypass valve operates when pressure in the "air buffer" exceeds the preset pressure causing the maximum permissible acceleration of the container and lets the surplus air out into the atmosphere. The auxiliary flow restrictors located between the beginning of the wider portion and the hole for the discharge of propelling air and which may be arranged at decreasing intervals along the direction of movement allow the air compressed in the "air buffer" to be let out in keeping with the law of distribution of the hole areas along the braking zone. Said auxiliary flow restrictors are set for the nominal parameters of the containers to be braked.

When it becomes necessary to brake smoothly the containers with widely varying technological parameters, i.e. mass, speed of entering into the braking zone and the coefficient of resistance to motion, and with the mass of the container varying from a fully loaded to an empty container, in the highly-efficient pneumatic tube transport systems where containers enter into the braking zone, at a high rate, also in multiple-address pneumatic tube transport systems, according to the invention, the flow-restricting hole in the wider portion is provided with a safety bypass valve with an actuator and its control system comprising the train speed transducers arranged so that the distances between them gradually decrease from the beginning of the braking zone towards the wider zone, setters of train speed for each preset point and a comparator for comparing the transducer and setter signals, the output of said comparator being connected with the actuator of the controllable valve for controlling its operation in accordance with the mismatching signal of the transducer and setter.

The provision of the safety bypass valve with a controllable actuator allows for smooth braking of the containers with widely varying parameters in accordance with a selected program of braking for each set of parameters (massers and speeds) and for slowing down the container at a preset point within the braking zone, i.e. at the point of contact with the plug, to a speed within a preset interval, from zero to a preset value. In this case the safety bypass valve with a controllable actuator simultaneously limits the pressure in the tube between the plug and the braked train to a value which causes the maximum permissible acceleration of the train. The speed transducers are arranged along the tube at intervals diminishing towards the end of the braking zone so as to retain a preset comparative accuracy of measuring the speed of the container throughout the length of the braking zone (a few percent) which proves to be particularly important at the end of the braking zone. The speed of the container being braked can be measured either by the position transducers secured to the tube, or by other conventional measuring methods, such as radar, optical, ultrasonic, etc.

In so far as in the high-capacity tubes, it is inadmissible to stop the container and reducing its speed to zero in the braking zone, unless otherwise provided by the technological cycle, according to the invention, the hole for the discharge of propelling air has a bypass valve maintaining the air pressure after the container train to be braked sufficient for building up a force stronger than the maximum force of resistance which keeps the container in the state of rest.

When containers are braked in the high-capacity pneumatic tube transport installations, i.e. those with a high frequency of container entrance into the braking zone, said containers possessing widely varying technological parameters, i.e. masses and speeds at which they enter the braking zone, it is practicable that a bypass by provided for putting the wider portion of the tube in communication with the section of the tube located before the wider portion, said bypass having a check valve which allows the air to flow from the tube into the wider portion when the containers enter the braking zone more frequently than they can be taken out in which case the skirts of the preceding container close the wider portion of the tube whereas the next container entering the braking zone can be braked with the aid of said bypass just like the preceding containers. Besides, according to the invention, the braking devive incorporates a computing device with a program unit connected to the speed transducers and to the pressure transducer located in the wider portion. Said computer calculates the parameters of the container to be braked, i.e. its mass and speed and, on the basis of the calculated parameters, connects the corresponding setter unit to the comparator.

Now the invention will be described in detail by way of example with reference to the accompanying drawings in which:

FIG. 1 illustrates a portion of the tube of a pneumatic transport installation wherein the braking device is realized in accordance with the present invention;

FIG. 2 illustrates a portion of the tube of a pneumatic transport installation with a provision for braking a container at an intermediate zone;

DETAILED DESCRIPTION OF THE INVENTION

Figure 3:
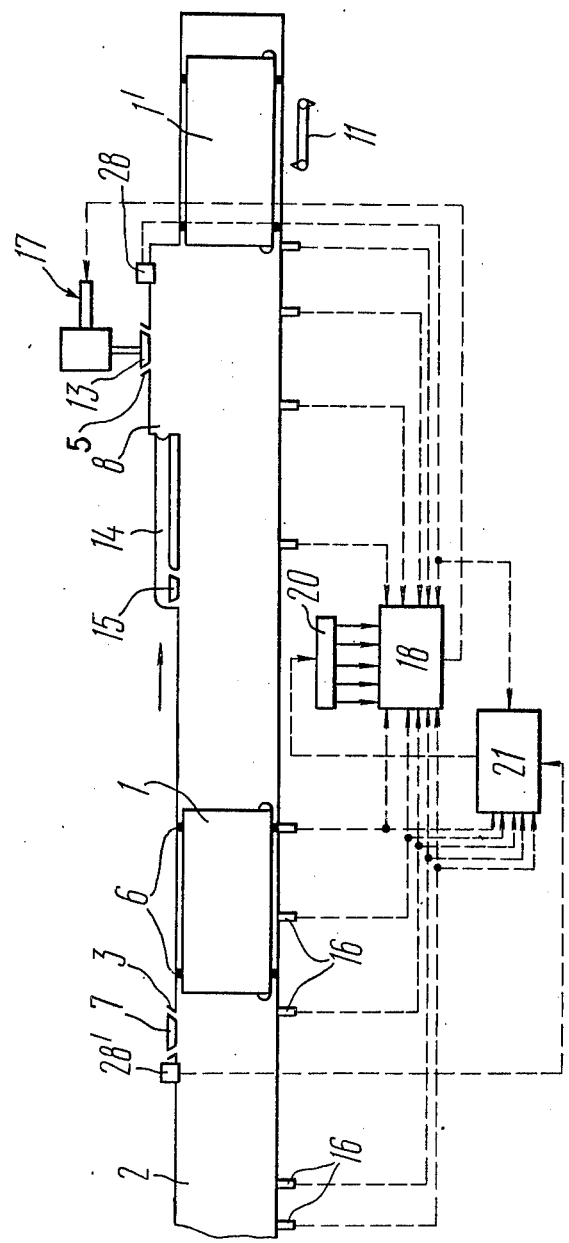
FIG. 3 illustrates a portion of the tube in a high-capacity pneumatic transport installation with a provision for braking containers with widely varying parameters and a high entrance rate both at the terminal and intermediate stations, and a control system.

FIG. 1 shows a container 1 in the tube 2 of the pneumatic transport installation. For braking containers, this zone of the tube has a hole 3 for discharging the propelling air (usually supplied from an air blower plant). The end of the tube is closed with a plug 4 provided with a flow-restricting hole 5.

The container 1 has sealing skirts 6. The air compressed between the first skirt 6 and the plug 4 forms the so-called "air buffer" which brakes the container 1. The flow-restricting hole 5 is intended for gradual discharge of the compressed air which ensures smoother braking of containers than in the prior art devices.

The selection of the release area through the flow restrictor for the discharge of compressed air determines the smoothness of braking by keeping the container speed within a permissible interval at the end of the braking process at a preset point. Here one has to distinguish between two radically different approaches to the selection of the flow-restricting hole, depending on the relation between the length of the braking zone and the distance between the end skirts of the container train.

Let us consider the case when pressure after the container is above amospheric throughout the process of braking. This is ensured provided the distance between the hole for the discharge of the propelling air and the flow restrictor is smaller than the distance between the end skirts of the container. Then the pressure after the container being braked is higher than atmospheric at least by $\Delta p$ ($=mgf/S$) where m = mass of container;
f = coefficient of mechanical friction of the container running gear;
S = the tube cross sectional area.

This condition makes it possible to select the size of the flow-restricting hole from the relation:

$$F = S \cdot W \sqrt{\frac{\xi}{RT(1-\epsilon)}}, \quad (1)$$

$$\epsilon = \frac{P_a}{P}, \quad (2)$$

where:
F = flow restrictor cross sectional area
W = permissible speed at end of braking zone;
$\xi$ = coefficient of local resistances;
R = gas constant;
T = temerature of compressed gas;
P = pressure of compressed gas;
$P_a$ = atmospheric pressure.

The size of the flow-restricting hole selected in this way allows the container to be brought to the end wall after a number of vibrations in the braking zone at a speed which is within the permissible interval.

If, however, the distance between the hole for the discharge of the propelling air and the flow restrictor is larger than the distance between the end skirts of the container, the size of the flow-restricting hole should be selected on the condition that not a single container whose mass, speed and coefficient of resistance to motion fall within the technological spread interval of these parameters, would strike the end wall.

The device functions as follows.

The container 1 moves through the tube 2 towards the braking zone under the effect of a pressure difference in said tube, said pressure difference depending on the technological process and being built by the air blower during starting the container 1 into the tube 2. Moving through the tube 2, the container 1 approaches the braking zone. The column of air pushed forward by the container 1 is forced out through the hole 3 for the discharge of the propelling air. Beginning with the moment when the front skirt 6 of the container 1 closes the air discharge hole 3, the container 1 having a kinetic energy which depends on the speed at which it enters the braking zone and on its mass, begins to be braked due to the force of counterpressure created by the pressure of the air compressed by the container in the tube between the front skirt 6 of the container 1 and the end plug 4.

The length of the braking zone is chosen so as to provide a possibility of braking the container 1 which has the greatest kinetic energy out of the preset spread of technologicl parameters (i.e. mass and speed of entering the braking zone) and minimum mechanical friction factor of the container running end.

Acted upon by counterpressure, the container 1 is braked while the air compressed in the tube between the front skirt 6 of the container 1 and the plug 4 escapes through the flow-restricting hole 5 into the atmosphere.

If the distance between the compressed air discharge hole 3 and the flow restrictor 5 is smaller than the distance between the end skirts 6 of the container 1, then pressure after the container 1 in the course of braking will be higher than atmospheric. The minimum value of this pressure will be equal to atmospheric plus the present pressure difference on the container which builds up the container propelling force and this pressure will grow as the next moving container comes nearer to the braking zone.

The kinetic energy of the container 1 is converted into the potential energy of compressed gas. The latter is capable of escaping through the flow-restricting hole 5. When the kinetic energy of the container 1 is converted into the potential energy of compressed gas in the "air buffer", at the non-zero value of potential energy in the "air buffer", the container 1 will start rolling back. This backrolling is opposed by the surplus pressure after the container 1. There will come a moment when the container 1 stops. At this moment the kinetic energy of the container and the pressure difference thereon are equal to zero. Under the effect of pressure after the container the pressure difference thereon grows and the container again starts to enter the braking device, though at a lower speed. In this case the air forms an "air buffer" and the container 1 is braked. The compressed air again starts escaping through the flow-restricting hole 5. This process will continue until the container 1 comes to the flow-restrictor 5 at a speed determined by the setting of said flow restrictor 5.

We shall now mention only the features distinguishing the process of braking the container 1 on the occasion when the distance between the air discharge hole 3 and the location of the flow restrictor 5 is larger than that between the end skirts of the container 1.

During the above-mentioned back-rolling the surplus pressure (i.e. pressure above atmospheric) will appear only after the rear end skirt 6' of the container 1 passes beyond the location of the propelling air discharge hole 3. From this moment on the case under consideration turns to be similar to the preceding one. If, however, the back-rolling container 1 stops before the rear skirt overlaps the air discharge hole 3, it will be able to resume motion only if the pressure in the "air buffer" during back-rolling has dropped below the atmospheric level at a corresponding size of the flow-restricting hole and if the pressure difference on the container is sufficient for overcoming the force of static friction of the container.

It should be noted that in this case the container 1 may stop at any undefined point between the hole 3 and the flow restrictor 5.

Let us turn to FIG. 2 which shows the device for braking the containers entering at a high cyclic rate into the beginning of the braking zone.

The propelling air discharge hole 3 in the beginning of the braking zone in the form of a tube 2 has a built-in bypass valve 7 which maintains such an air pressure behind the container which will certainly succeed in overcoming the maximum force of resistance to motion. At the end of the braking device the tube has a wider portion 8 with a flow restrictor 9 at the end for discharging compressed air. It should be borne in mind that the flow restrictor 9 may be located in any other point of the wider portion 8. The length of the wider portion should be not less than the distance between the extreme end skirts 6 of the container to prevent said skirts 6 of the container located in the wider portion from overlapping the communication of flow restricting hole and the compressed air zone. The wider portion is also provided with a safety bypass valve 10 which operates when the pressure in the tube between the moving and already braked containers 1 and 1' is higher than that causing a maximum permissible acceleration. At least one valve similar to the one just mentioned is installed between the beginning of the wider portion 8 and the bypass valve 7. Such an arrangement of the valves 10 limits the pressure of compressed air regardless of the position of the last skirt of the braked container 1'. Let us note that the container 1' can be either removed from the braking zone by a drive 11, or it can stay still. In the latter case there is no need to provide the wider portion and all the associated fittings installed thereon. Then the flow restrictor 9 and the valve 10 should be installed in close proximity to the last skirt of the already braked container 1'.

The portion of the tube between the bypass valve 7 and the beginning of the wider portion (for the movable container 8) or the location of the valve 10(for the immovable container) is provided with a number of auxiliary flow restrictors 12. The pitch of said flow restrictors can be either uniform or arbitrary, though it is preferable to space them at shorter intervals at the end of the braking zone.

The rate of air flow through the total passage area of the flow restrictors 9 and 12 at a given pressure setting of the bypass valve 7 should not be higher than the rate of air flow ensured by the container moving at the end of the line at a minimum speed corresponding to the operational duty of the system, i.e.

$$F_\Sigma \leq SW_{min} \sqrt{\frac{\varepsilon}{RT(1-\varepsilon)}} \qquad (3)$$

$$\varepsilon = \frac{P}{P_1}, \qquad (4)$$

where:
- $W_{min}$ = minimum possible speed of the container at the end of the line;
- $P_1$ = pressure setting of bypass valve 7;
- $F_\varepsilon$ = total passage area through flow restrictors 9 and 12.

It is proved by calculations that the total passage area of the flow restrictors 12 should be distributed so as to decrease it at the beginning of the braking zone and increase it towards the end. Such distribution will give a maximum increase in the permissible frequency at which the container trains enter the braking zone. If, however, the frequency requirements are not high, the total area of the flow restrictors 12 can be distributed uniformly.

The setting of the flow restrictor 9 is selected similarly to the first version described above with reference to FIG. 1. The container braking device functions as follows.

Beginning with the moment when the front skirt of the container 1 passes the location of the bypass valve 7, the air starts to be compressed between said front skirt and the skirt of the container 1'. The kinetic energy of the container being braked changes into the potential energy of compressed gas. As the container 1 moves on, its front skirt overlaps part of the flow restrictors 12 thus preventing the compressed air from flowing out through their holes. The compressed air escapes mainly through the remaining uncovered flow restrictors 12 and the flow restrictor 9. The air flows through the flow restrictor 9 if the last skirt of the container 1' does not cover the wider portion of the braking device. At the instant when the pressure of compressed gas rises above the maximum permissible value, one of the valves 10 (depending on the position of the container 1') opens and lets out the surplus air. The potential energy of the compressed air diminishes in direct proportion to the discharged amount of air and, correspondingly, its work applied for back-rolling the container 1 diminishes too. However, the amount of discharged air cannot be infinitely large since the potential energy of compressed air is spent for braking the container.

The provision of the flow restrictors 12 makes it possible to stabilize the speed of the containers with different parameters, viz., speed of entrance into the braking zone, mass and coefficient of resistance to motion.

Let us assume, that braking is applied to a container whose entrance speed is higher than the rated value. Then, by a certain fixed moment, the container skirt will cover a larger number of the flow restrictors 12 and, as a consequence, the average discharge area within the considered time period will be smaller. Therefore, the compressed air pressure will be higher and this container will be braked more intensively than the one with the rated entrance speed. Similar arguments hold good for a container with a heavier mass and a lower coefficient of resistance. The reverse dependence for pressure at any fixed moment is true for containers with a lower entrance speed, a lighter mass and a higher coefficient of resistance than the above-listed nominal values.

It is practicable that the flow restrictors 12 with the abovementioned type of area distribution should be set so that the containers with maximum speeds and masses and a minimum coefficient of resistance out of the predetermined spread of parameters would be braked near the container 1'. This will afford a maximum possibility for opening the flow restrictors 12. In such a case, this setting for a container with a different set of parameters will make it possible to decrease the back-rolling energy thus reducing the time required for the process of braking.

Let us turn to FIG. 3 which illustrates the device for braking containers in high-capacity pneumatic tube transport installations where the containers are characterized by a wide spread of technological parameters and enter the braking device at a high frequency. The device can be installed either at terminal or intermediate stations.

At the beginning of the braking zone in the form of a tube 2 the compressed air discharge hole is provided with a bypass valve 7 which maintains the pressure of air after the container 1 at a level sufficient for overcoming the maximum force of resistance to motion.

The pressure setting of this valve is found from the following relation:

$$P \geq \frac{M_{max} \cdot g \cdot f_{max}}{S}, \quad (5)$$

where:
P = pressure setting of valve;
$M_{max}$ = maximum mass of trains being braked;
g = gravitational acceleration;
S = the tube cross sectional area;
f = maximum static dry friction coefficient.

At the end of the braking device the tube has a wider portion 8 whose flow-restricting hole is provided with a controllable safety bypass valve 13. The length of the wider portion 8 should be not less than the distance between the extreme end skirts 6 of the container 1 so as to prevent the container 1 from covering said bypass valve 13.

The controllable safety bypass valve 13 covers the flow-restricting hole whose passage area is selected on the condition that the mass flow rate of air through a completely open valve would be not under $$M = \pi \mu d h \sqrt{\frac{2K}{K-1} f_A f_A^1} \cdot \sqrt{\left(\frac{P}{P_A}\right)^{\frac{K-1}{K}} - 1}, \quad (6)$$

where
$\mu = 0.6$ = coefficient of geometry of air discharge passage area;
d = hole diameter;
K = 1.4 = adiabatic index;
$\rho_A = 1.3$ kg/m$^3$ = air density;
$P_a = 1.013 \cdot 10^5$ /N/m$^2$/ = atmospheric pressure;
P — /N/m$^2$/ = pressure in "air buffer";
M — /kg/s/ = mass flow rate of air.

Hence, the discharge area through the flow restrictor covered by the safety bypass controllable valve can be calculated as follows:

$$F = \frac{M}{\sqrt{\frac{2K}{K-1} f_A f_A^1} \sqrt{\left(\frac{P}{P_A}\right)^{\frac{K-1}{K}} - 1}}. \quad (7)$$

Bypass 14 is located before the wider portion. One end of it is connected to the wider portion 8 while its other end communicates with the tube 2 through the check valve 15. The length of the bypass 14 should be equal to the distance covered by the container 1 at the end of airbuffer at an approximately constant speed. The cross-sectional area of the bypass is found as the cross-sectional area of the air discharge hole 3 with a bypass valve 7, and as the cross-sectional area of the flow-restricting hole with the safety bypass controllable valve 13. The check valve 15 operates at a pressure which exceeds the pressure setting of the bypass vavle 7 by $1 \times 10^3 - 2 \times 10^3$ N/m$^2$. Container speed transducers 16 are arranged along the tube 2. The speed transducers 16 are spaced at gradually decreasing intervals towards the end of the braking zone. The distances between the transducers 16 are selected with a view to accurate measurement of speed and so as to retain the relative accuracy of measurement substantially constant throughout the braking zone which proves to be particularly important at the end of the braking zone. At least two transducers should be located before the bypass valve 7 at a pitch equal to that at the beginning of the braking zone on a distance determined by the speeds of containers in the linear portion of the tube and by the reversal time of the valve 13.

The speeds of the containers 1 can be measured by other methods too, e.g. optical, radar methods, etc. However, it is essential that the speed and the interval between the containers should be measured simultaneously.

The safety bypass controllable valve is controlled by an actuator 17. The actuator comprises a powerful electric motor (about 10$^3$W) which drives a gear oil pump delivering oil at a pressure of $50 \cdot 10^5$ N/m$^2$ through an electromagnetcontrolled slide valve into one of the spaces located on both sides of the piston. The piston moves inside the servocy linder under the force of the pressure difference and actuates the output rod with a force of up to 2000 N and at a maximum speed of 0.05–0.07 m/s. The speed of the rod is in direct proportion to the signal received by the control electromagnet.

Figure 4:
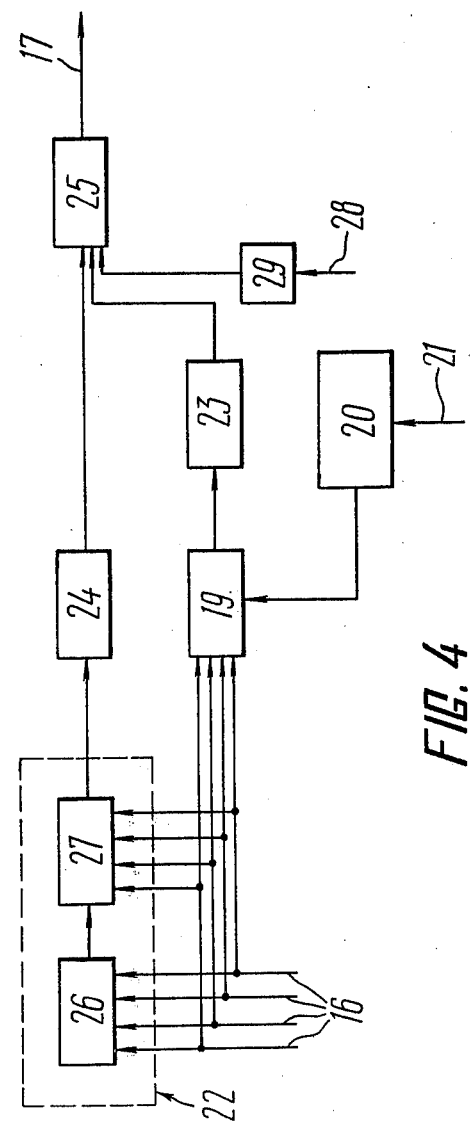
FIG. 4 illustrates an embodiment of a part of the control system.

The control signal is sent to the actuator 17 from the comparator 18 in accordance with the signals of mismatching between the true speed of the container 1 determined by the signals of the speed transducers 16 and the signals of the motion speed program unit 19, said speed being set by the speed setter unit 20 in accordance with the parameters of the container 1 calculated by the computer 21. An embodiment of the comparator unit 18 is shown in FIG. 4. The comparator comprises a unit 22 for determining the speed of the container 1 and the motion speed program unit 19, the inputs of both units being connected to the speed transducers 16 and the outputs, to the inputs of the comparator unit 25 via square-law generators 23, 24. The unit 22 comprises series-connected time interval meter 26 and a divider 27 whose function is to divide the fixed distances between the transducers 16 by the measured time interval of the movement of the container 1 between them. The speed and functionally related to it pressure setter unit 20 is a combination of groups of speed and pressure setters which determine the program of braking the containers suitable for various possible sets of container parameters.

Said combination is connected by means of the speed setters to the motion speed program unit 19 and the pressure setters to the comparator unit 25 on the signals sent from the output of computer 21, which determine said parameters. The wider portion 8 of the tube 2 also accommodates a pressure transducer 28 measuring the true pressure in the "air buffer". The signal of this transducer is delivered via the converter 29 in appropriate values to the comparator 25 for correcting the programmed pressure signal in accordance with square difference of the programmed and true speeds. The difference between the signal from the transducer 28 and the corrected signal is determined in the comparator 25. This difference is the control signal, which is delivered to the actuator 17 to change the pressure in the "air buffer" according to the control signal. This improves the accuracy of adjustment. Besides, the transducer 28 is used to select the appropriate group of speed setters.

Thus, in braking the containers with widely varying parameters it is possible to obtain a minimum braking time for all containers if the pressure in the "air buffer"

is changed according to the programmed speed and pressure functionally related with this speed depending on container parameters.

This requirement is met by providing a computer 21 connected with the speed transducers 16 and with the pressure transmitter 28, and made in such a manner that it calculates the speed of container entrance into the braking zone and evaluate the effect of parameters of the container 1 being braked; depending on the calculated parameters the computer 21 connects the required container motion speed program and functionally related with it the pressure program from the setter unit 20 to the comparator 18.

The device operates as follows.

Before the beginning of operation of the pneumatic tube transport installation the container 1' must be placed after the wider portion of the tube 2. Now disclosure will be made of possible variants of operation of the braking device depending on the parameters of the containers.

Let us consider the process of braking the containers with identical parameters, i.e. the speed of entering the braking zone, and mass.

The container 1 approaches the braking zone. The speed transducer 16 located before the bypass valve 7 register the fact of container 1 approach to the braking zone and the comparator 18 sends a signal to the actuator 17 which closes the bypass hole of the valve 13.

From the moment when the front end skirt 6 of the container 1 passes the location of the bypass valve 7, the air in the space between said front skirt of the container 1 and the skirts of the container 1' begins to be compressed. The air pressure in the "air buffer" rises while after the container 1 it is maintained by the bypass valve 7. Thus, in order to provide the requisite braking force, it is sufficient to change pressure in the space between the container 1 being braked and the previously braked container 1'. In the comparator 25 the programmed pressure is compared with the true "air buffer" pressure, measured by the pressure transducer 28 and control signal is sent to the actuator to develop the true pressure up to the programmed value.

Simultaneously, the speed transducers 16 measure the speed of the container being braked at its front skirt 6 and compare the results with the speed setters in the unit 25 of the comparator 18. The mismatching signal corrects the programmed pressure and the corrected pressure signal is compared with the true pressure in the "air buffer"; the mismatching signal between the latters is sent to the actuator 17, which sets the valve 13 to the required position. An example of the comparator 18 is shown in FIG. 4. In this case the programs of the container speed and the pressure in the "air buffer" are set in the unit 20 once and for all and are not subject to subsequent changes.

This creates the required force of counterpressure applied to the container 1 being braked. The kinetic energy of the container 1 turns into the potential energy of compressed gas. As soon as pressure in the "air buffer" becomes somewhat higher that the permissible pressure selected on the condition of permissible accelerations of the container, the safety bypass controllable valve 13 will discharge the surplus air into the atmosphere, thus preventing the container from being accelerated in excess of the permissible limits.

As the container 1 moves through the braking device, its speed drops whereas the safety bypass controllable valve 13 responding to the mismatching signal delivered to the actuator partly opens or closes, thus preventing the relative speed of smooth joining of the containers 1 and 1' from exceeding the permissible limits. The smoothness of contact is ensured by the selected law of pressure change.

Let us consider an example when the containers to be braked possess indentical masses and different initial speeds.

As the container 1 approaches the braking zone, the speed transducers 16 located before the bypass valve 7 measure the speed of the container 1 to be braked. Depending on this speed, the comparator 18 sends a signal to the actuator 17 which sets the valve 13 to the required position, i.e. widely opens or closes the bypass hole. Thus, when the container 1 moves at a maximum speed within the permissible speed interval, it encounters the closed valve while moving at a minimum speed, it comes to the open valve.

The container 1 moving at a maximum speed is braked in the manner described above.

Let us now consider the process of braking the container moving at a minimum speed.

In accordance with the preset law of control such a container meets the open bypass valve 13 in the braking zone and continues moving through the braking zone in the same way as in the linear portion of the tube, even increasing its speed due to the pressure difference on it created by the bypass valve 7. This movement of the container 1 will continue until the comparator sends a signal to the actuator for closing the valve 13. Then pressure in the "air buffer" will grow in accordance with the mismatching signals of the transducers and setters so that the container 1 will come smoothly in contact with the container 1'.

When the containers to be braked have widely varying masses and initial speeds, the braking device incorporates a computer 21 connected with the setter unit 20. The computer 21 receives signals from the speed transducers 16 located before the bypass valve 7. Receiving the signals from the speed transducers 16, the computer 21 determines the speed at which the container 1 enters the braking zone. Depending on this speed the containers entering the braking zone meet the open or closed valve 13. The computer 21 receives signals from the speed transducers 16 located at the beginning of the braking zone and from the pressure transducers 28 in the wider portion 8 of the tube 2 and 28' located on the tube 2 near the valve 7; meanwhile, the pressure after the container is maintained by the valve 7 and the parameters of the container 1 to be braked are evaluated. The signal from the transducer 28' can be substituted by a signal in the form of a pressure setting of the valve 7. However, this ensures a lower accuracy since the wave processes in the tube tend to change somewhat the pressure in the zone of the valve 7. In accordance with the calculated parameters of the container 1 the computer 21 connects the required motion speed program 19 and the pressure program from the setter unit 20 to the comparator unit 25 of the comparison element. The containers are braked in the same manner as described above with the sole difference that each container is braked in accordance with the optimum law for its parameters from the viewpoint of time minimization.

The container 1 comes in contact with the already braked container 1' at any point of the wider portion of the tube 2.

If the frequency of container entrance has risen sharply for some reason, so that the container 1' has not yet passed through the wider portion but the container 1 has already contacted it so that the skirts of said container 1 have covered the wider portion of the tube, the next container will all the same be able to be braked with the aid of the bypass 14 which puts the braking zone in communication with the controlled-pressure space. The check valve 15 shutting-off the bypass 14 does not operate unless pressure in the braking zone which is cut-off from the wider portion is higher than the pressure in the wider portion by $1.10^3 - 2.10^3$ $N/m^2$; the valve does not open in the opposite direction, on the contrary, it is closed even tighter.

In the high-capacity pneumatic tube transport installations with a high cycle recurrency rate the container 1' is continuously brought out of the braking zone by the actuator 11. However, if the cycle recurrency rate decreases, one or two containers 1' will always be after the wider portion. The constructive length of the braking zone is selected so as to make it possible to brake the container 1 with a maximum mass, maximum speed and a minimum coefficient of resistance to motion at a maximum pressure in the "air buffer" which does not cause accelerations exceeding the premissible limit.

The braking of such a container on the above-stated length of the braking zone determines the minimum braking time. The containers entering the braking zone at a low speed out of the preset speed range are braked in a shorter air buffer so that their braking time comes close to the time taken for braking a container moving at a maximum speed.

The device excludes back-rolling and stopping of the containers which ensures trouble-free operation of the pneumatic tube transport installations as a whole.

The instrumentation of the braking device is all duplicated thus ensuring a high reliability of the device.

The disclosed device for braking containers makes it possible not only to brake the containers with widely varying parameters to a preset terminal speed in a minimum time but also to stabilize the speeds of individual containers, i.e. to reduce or increase them to the preset limit which is of particular importance at intermediate stations.

What is claimed is:

1. A device for braking containers in a braking zone of a tube of a pneumatic tube transport installation, said containers having sealing skirts, comprising: an opening defined in a portion of the wall of the tube defining the braking zone for the discharge of propelling air; a tube plug located after said air discharge opening in the direction of container movement for closing said tube of the pneumatic tube transport installation so that air compressed between the skirt of the container and said tube plug brakes the container; a flow restricting opening for letting out air compressed between the tube plug and the container skirt; a plurality of auxiliary flow restricting openings positioned in the tube between the flow restricting opening for letting out the compressed air and the opening for the discharge of the propelling air; and a safety bypass valve located in the braking zone and operating when pressure in the tube between the plug and the container is higher than that causing a maximum permissible acceleration of the container.

2. A device according to claim 1 wherein each of the containers has a leading and a trailing end skirt, wherein the tube plug is constituted by a skirt of a previously braked container which seals off the tube and which is located after the braking zone, and wherein, at the end of the braking zone, the tube has a wider portion whose length is equal or greater than the distance between the leading and trailing end skirts, the flow restricting opening for letting out air compressed between the moving and the already braked container being located in the wider portion.

3. A device for braking containers in a braking zone of a tube of a pneumatic tube transport installation, said containers having sealing skirts, comprising an opening for the discharge of propelling air defined in a wall of the tube of the pneumatic tube transport installation; a tube plug located after said opening for air discharge in the direction of container movement and sealing off said tube of the pneumatic tube transport installation, so that air compressed between a skirt of the container and tube plug brakes the container; said tube having a wider portion at the end of the braking zone; a flow-restricting opening for the discharge of the air compressed between the plug and the container skirt, said opening being located in the wider portion of the tube; a controllable safety bypass valve installed in said flow-restricting opening; an actuator for said controllable safety bypass valve; and a control system for controlling said actuator comprising transducers arranged in the tube at preset points with intervals gradually decreasing from the beginning of the braking zone towards the wider portion for sensing actual container speed in the tube, signal means for indicating a desired container speed at each preset point, and a comparator for comparing the speed sensed by the transducers with the desired speed indicated by said signal means, the output of said comparator being connected to the actuator for controlling its operation in accordance with the difference between desired and actual container speed.

4. A device according to claim 3 wherein the wider portion of the tube communicates through a bypass with the portion of the tube before the wider portion and wherein said bypass incorporates a check valve which allows the air to flow from the tube into the wider portion when the latter is sealed off by a container skirt.

5. A device according to claim 3 wherein the propelling air discharge hole has a bypass valve to maintain a pressure of air after the container being braked, said pressure building up a force which exceeds the maximum force of resistance which keeps the container in the state of rest.

6. A device according to claim 3 wherein said control system for controlling said actuator includes first sensing means located in said tube at a predetermined distance from said braking zone for sensing the mass of a container moving towards said braking zone; second sensing means located in said tube at a predetermined distance from said braking zone for sensing the speed of a container moving towards said braking zone; and means responsive to said first and said second sensing means for determining desired container speeds indicated by said signal means.

* * * * *